United States Patent

Ono

[15] 3,678,421

[45] July 18, 1972

[54] PRESET DEVICE FOR ALL CHANNEL TUNER USING VARIABLE REACTANCE ELEMENT AS TUNING ELEMENT

[72] Inventor: Ichiro Ono, Tokyo, Japan

[73] Assignee: Alps Electric Co., Ltd., Tokyo, Japan

[22] Filed: Oct. 6, 1970

[21] Appl. No.: 78,518

[30] Foreign Application Priority Data

Oct. 6, 1969 Japan....................................44/95246

[52] U.S. Cl.....................................334/15, 338/134, 334/51, 334/14, 338/172, 338/215

[51] Int. Cl.....................................................H03j 3/18

[58] Field of Search.............................334/14, 15, 16, 40, 51; 338/134, 191

[56] References Cited

UNITED STATES PATENTS 3,391,347 7/1968 Bosse et al. ...........................334/15 X
3,110,004 11/1963 Pope....................................334/40 X
2,493,184 1/1950 Budd et al...............................338/134
2,950,455 8/1960 Brown....................................338/134
2,978,651 4/1961 Canada...................................334/51
3,167,730 1/1965 Anderson et al..........................334/15

*Primary Examiner*—Herman Karl Saalbach
*Assistant Examiner*—Saxfield Chatmon, Jr.
*Attorney*—Sughrue, Rothwell, Mion, Zinn & Macpeak

[57] ABSTRACT

This invention relates to an all channel tuner with means for tuning a variable capacitance element, said means interlocking with an operating shaft of a power source changeover switch. The power source changeover switch changes the polarity of a switching element for short-circuiting part of a coil for the tuning of a VHF tuner. A variable resistor selection switch adjusts a reverse bias to the variable capacitance element. The selection of a desired frequency band and the selection of the variable resistors for a desired channel are simultaneously carried out by the rotation of a channel shaft. A variable reactance element is used as the tuning element. A driver engages the shaft of one of the variable resistors by the pressure in the axial direction of the adjusting shaft. The adjusting shaft is coaxial with the channel shaft.

5 Claims, 9 Drawing Figures

PATENTED JUL 18 1972 3,678,421

INVENTOR
ICHIRO ONO
BY Sughrue, Rothwell, Mion, Zinn & Macpeak
ATTORNEYS

PRESET DEVICE FOR ALL CHANNEL TUNER USING VARIABLE REACTANCE ELEMENT AS TUNING ELEMENT

The present invention relates to a preset device of an all channel tuner using a variable reactance element as a tuning element, and more particularly relates to a preset device which is capable of effecting automatic channel selection of both UHF and VHF bands by the rotation of only one operating shaft.

An object of the present invention is to provide a preset device capable of effecting automatic changeover of each channel of UHF with the rotation of the one operating shaft.

Another object of the present invention is to provide a preset device which comprises a switch with two switch wafers of simple construction.

A further object of the present invention is to provide a preset device capable of separating particular variable resistors from a channel changeover device.

A still further object of the present invention is to provide a preset device capable of varying resistors for each channel of the UHF and VHF bands by means of a printed circuit on a base plate.

A more specific object of the present invention is to provide a preset device in which a changeover switch for UHF and VHF bands is interlocked with a changeover shaft which is on a base plate. The shaft is separated from the base plate which has resistors thereon and is capable of simultaneously selecting the desired frequency band and the variable resistors for a desired channel by the rotation of an adjusting body.

A particular object of the present invention is to provide a preset device capable of effecting fine adjustment by only the pressure or rotation of a fine adjusting shaft.

Various further and more specific objects, features and advantages of the invention will appear from the description given below, taken in connection with accompanying drawings illustrating by way of example a preferred embodiment of this invention.

DESCRIPTION OF THE PREFERRED EMBODIMENT

Figure 1:
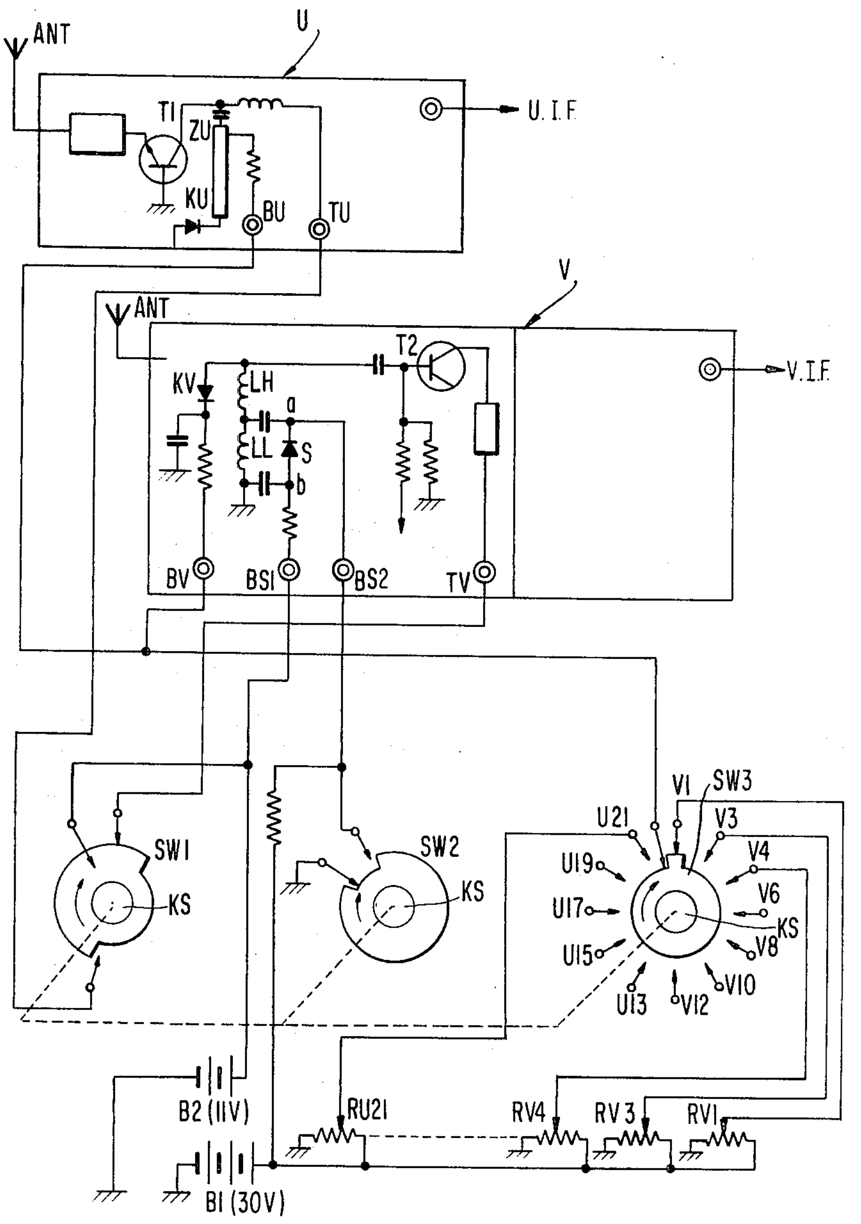
FIG. 1 is a wiring diagram showing the reception condition of a low band (1 channel) of the VHF band.

In FIG. 1, symbol U is the UHF tuner of which only the transistor $T_1$ for amplification of high frequency is illustrated, and the remaining unit is omitted. $T_{\ell'}$ is the connector terminal of the power source for operation of the transistor of the UHF tuner, $K_{\ell'}$ is the variable capacitance element, $Z_{\ell'}$ is the inductance element for tuning, and $B_{\ell'}$ is the reverse bias supply terminal to the variable capacitance element.

V is the VHF tuner of which only the transistor $T_2$ for amplification of high frequency is shown, the remaining unit being omitted. $L_H$ and $L_L$ are the tuning coils for high band and low band of the respective VHF bands, S is the switching element for handling the changeover of the $L_L$ from the high band to the low band. $K_{v'}$ is the variable capacitance element, $T_{v'}$ is the supply terminal of the power source for the transistor $T_2$ and $B_{v'}$ is the reverse bias supply terminal to the variable capacitance element $K_{v'}$. $B_{S1}$ and $B_{S2}$ are respectively the voltage supply terminals to the switching elements S from the power source $B_2$ (11 V) and power source $B_1$ (30 V). $SW_1$ connects the transistor $T_1$ for each tuner to power source $B_2$. $SW_1$ is the switch for power source changeover for operating either transistor $T_1$ or $T_2$ of the respective tuners and is interposed between the power source $B_2$ and terminal $T_{\ell'}$. $SW_2$ is the power source changeover switch for changing the polarity of the switching element S. $R_{v1}$ adjusts the bias voltage of the variable capacitance element $K_{v'}$ for the VHF band. $R_{\ell 13}$, $R_{\ell 15}$ . . . $R_{\ell 21}$ are the variable resistors for adjusting the bias voltage of the variable capacitance element $K_{\ell'}$ for the UHF band. $SW_3$ is the changeover switch for selecting one of the various resistor groups which are interposed between the power source $B_1$ and the terminal $B_{\ell'}$ or $B_{v'}$.

In operation, FIG. 1 shows the condition for reception of the low band (1 channel) of the VHF band. The transistor $T_2$ is supplied by the power source $B_2$, and a reverse bias (the voltage of the difference between the power sources $B_1$ and $B_2$) is supplied to the switching element S. The reverse bias which is adjusted by the variable resistor $R_{v1}$ is supplied from the power source $B_1$ to the variable capacitance diode $K_{v'}$. As a result, switching element S is non-conductive and the tuning circuit is formed by the variable capacitance element $K_{v'}$ and $L_L$ and $L_H$ which produce the capacitance $O_{dv'}$.

Figure 2:
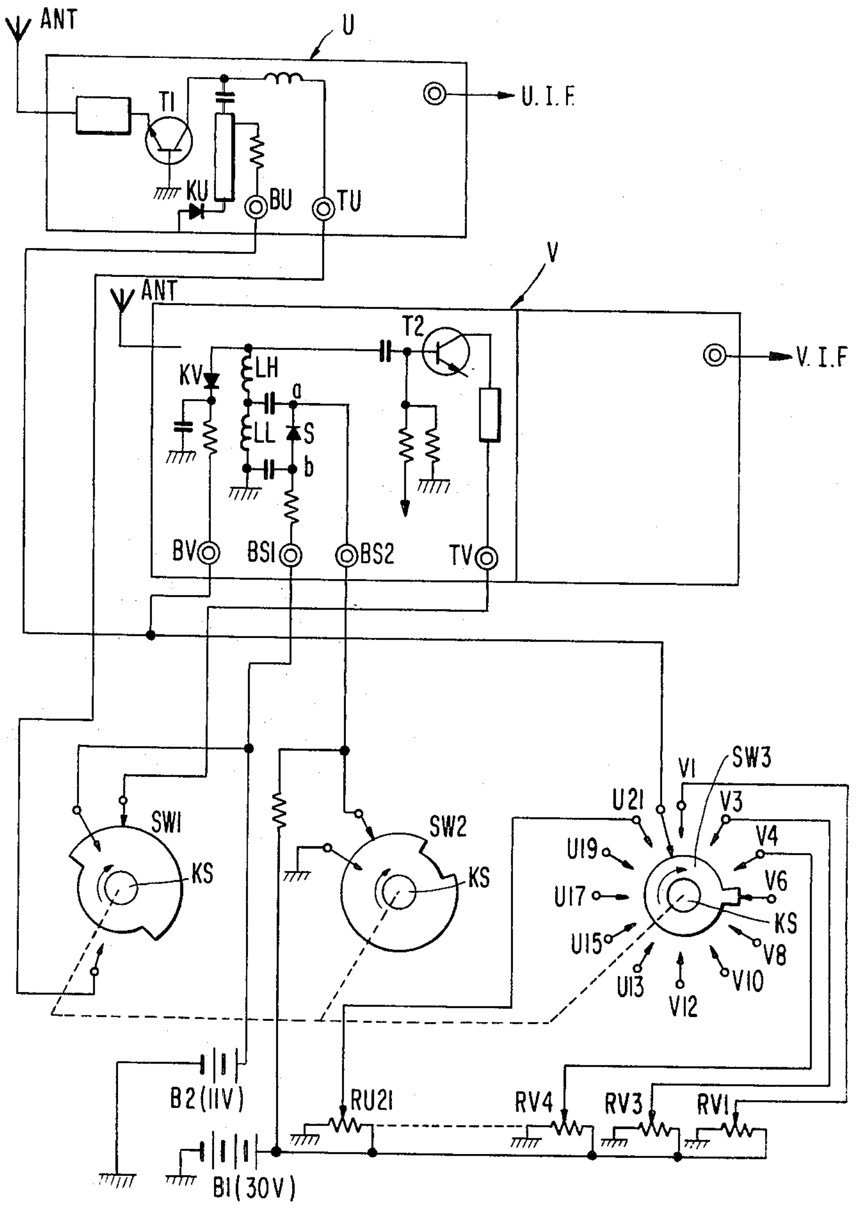
FIG. 2 is a wiring diagram showing the reception condition of a high band (6 channels) of the VHF band.

FIG. 2 shows the condition of reception of the high band (6 channels) in the VHF band. A forward bias is supplied from the power source $B_2$ to the switching element S, and except for the short-circuiting between the terminals a and b of the switching element S, it operates in the same manner as the circuit of FIG. 1. The tuning circuit is formed by the coil $L_H$ and the variable capacitance element $K_{v'}$.

Figure 3:
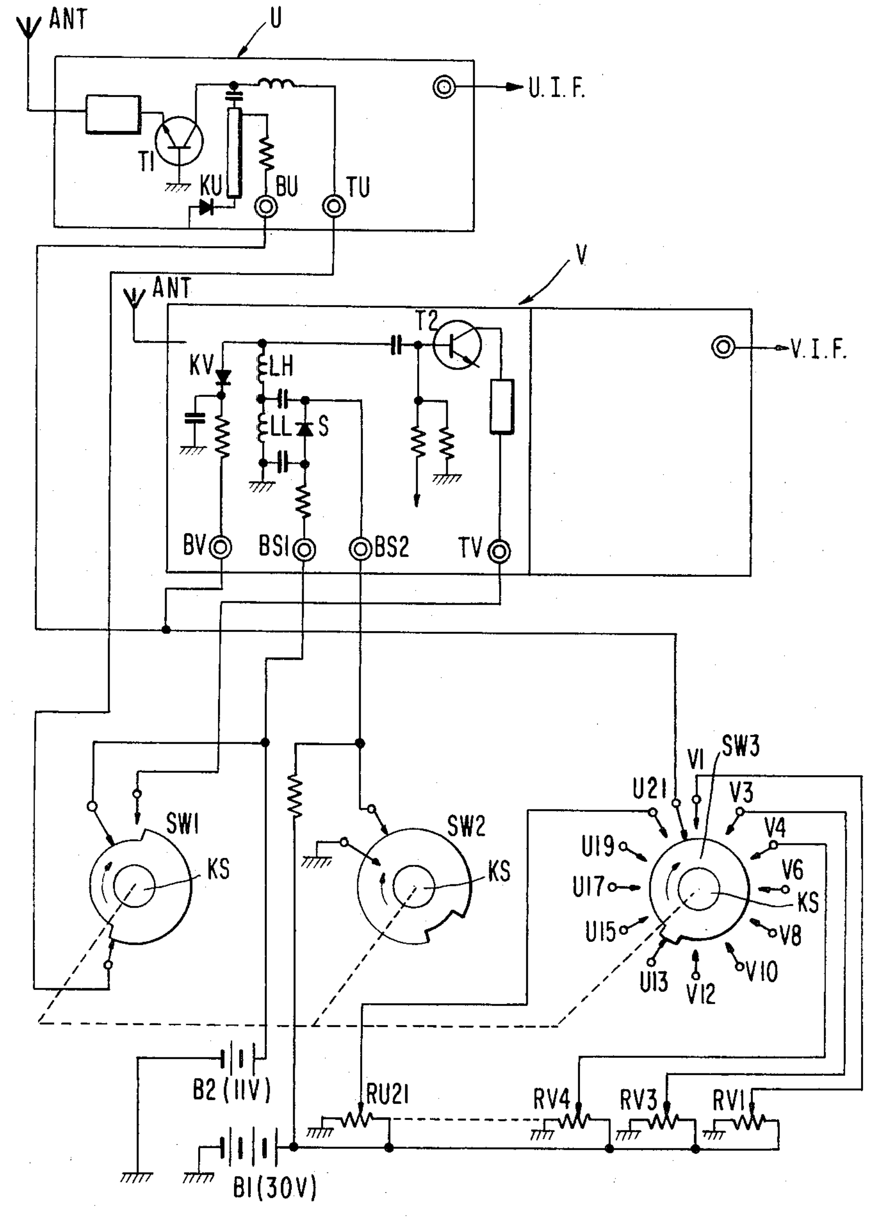
FIG. 3 is a wiring diagram showing the reception condition of UHF (13 channels)

FIG. 3 shows the condition for reception of the UHF band (13 channels). Transistor $T_2$ is held off by the switch $SW_1$ and transistor $T_1$ operates. The reverse bias which is adjusted by the variable resistor $R_{\ell 13}$ is supplied by the power source to the variable capacitance element $K_{\ell'}$. As a result, the tuning circuit is formed by the variable capacitance element $K_{\ell'}$ producing the capacitance $O_{d\ell'}$ and the inductance element $Z_{\ell'}$.

Figure 4:
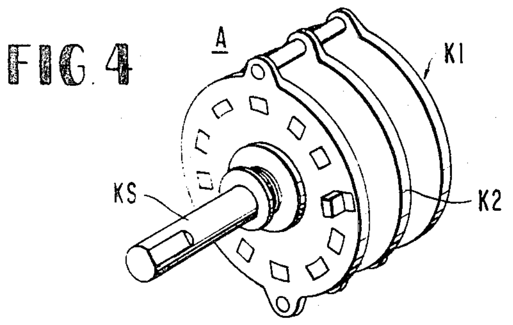
FIG. 4 is a perspective view of the channel changeover device.

FIG. 4 shows one example of the channel changeover device of the tuner of the present invention. $SW_1$ and $SW_2$ are each on one surface of the switch wafer $K_1$ and one surface of the switch wafer $K_2$ has $SW_3$ thereon. Each switch is interlocked with the operating shaft KS.

Figure 5:
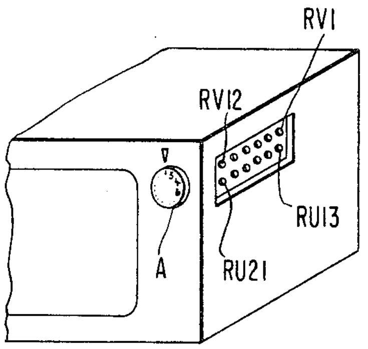
FIG. 5 is a perspective view showing the condition in which the tuner is incorporated in the television set.

FIG. 5 shows one example of the television set in which the tuner of the present invention is incorporated. Changeover device A is disposed in the front panel of the television set, and each variable resistor $R_{v1}$, . . . $R_{\ell 13}$, . . . $R_{\ell 21}$ is mounted at the side of the television set.

A switch for switching a pilot lamp for displaying the reception frequency band may be provided on the reverse side of switch wafer $K_2$. The display of the reception band may thereby be automatically carried out.

Figures 6, 7, 8, 9:
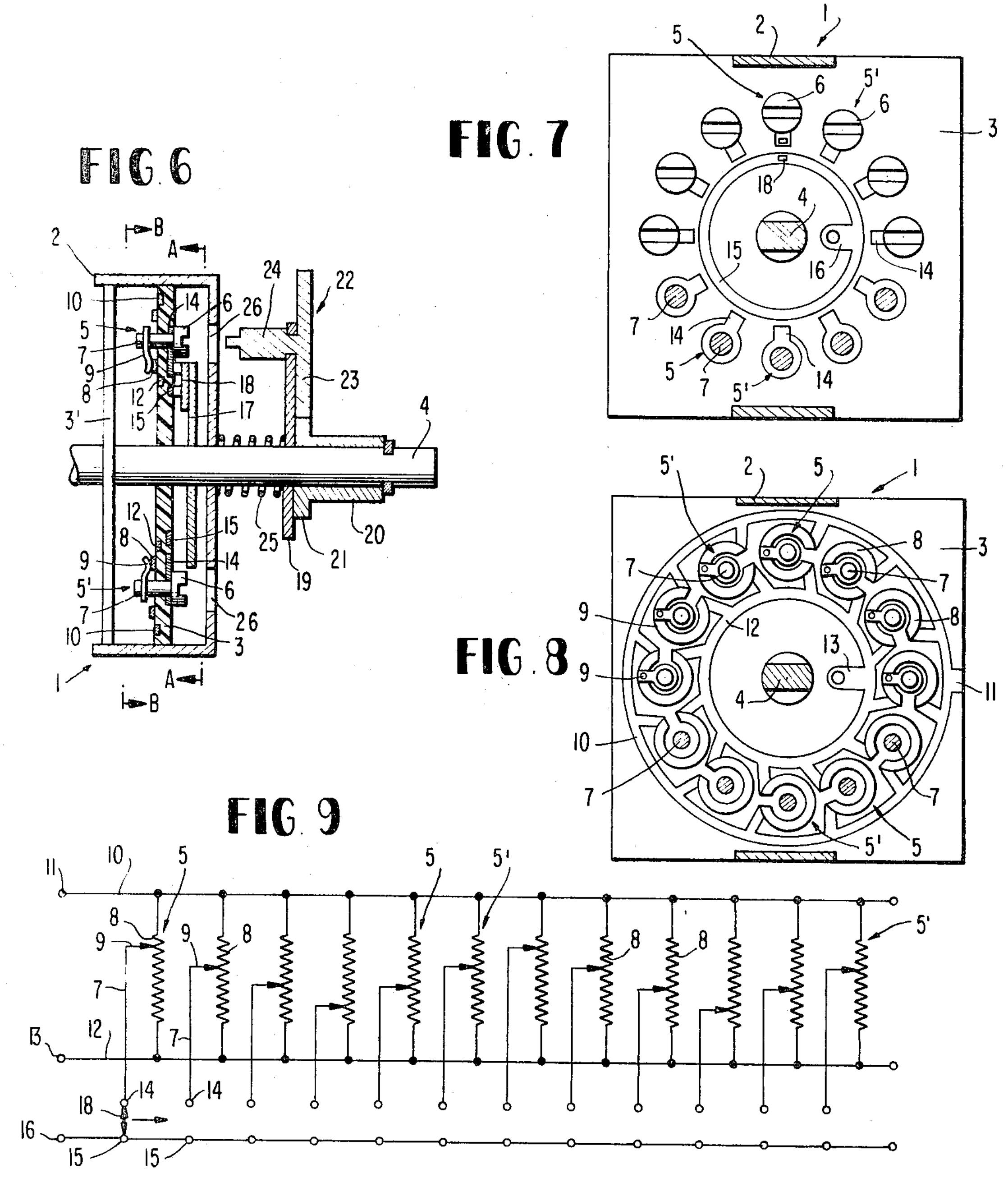
FIG. 6 is a sectional view of the essential part of the tuner in another embodiment of this invention.
FIG. 7 is a cross section taken along a line A—A of FIG. 6.
FIG. 8 is a cross sectional view taken along a line B—B of FIG. 6.
FIG. 9 is a wiring diagram of the essential part of the preset device.

In FIGS. 6 trough 9, 1 denotes the tuner proper, 2 is the tuner frame, 3 and 3' are insulating base plates mounted on the frame 2. The channel switching shaft 4 is rotatably mounted through the base plates 3 and 3' and is operated stepwise by a stepping mechanism (not illustrated in the drawing). 5 and 5' are the variable resistors for the UHF band and VHF band which are formed concentrically with the shaft 4 on the insulating base plate 3 according to the number of the channels. All of said variable resistors penetrate the base plate 3 and are formed by the shaft 7 having the head portion 6, C-type resistor 8 formed in print on the reverse surface of the base plate 3, and the sliding element 9 which is mounted on the shaft 7 and is slidable on the resistor bodies 8.

Respective ends of the respective resistor bodies 8, as shown in FIG. 8 are connected by the conductor 10 of the printed wiring and are thereby connected to the common terminal 11. The other ends thereof are connected by the conductor 10 and are thereby connected to the common terminal 13.

The head portions 6 of the shafts 7 of the respective resistors are elastically connected with the contacts 14 of the printed wiring provided on the surface of the base plate 8 as shown in FIG. 7. The common contact 15 of circular type of the printed wiring is provided on the inside of the contact 14. Common contact 15 is connected to the terminal 16.

17 is the insulated plate fixed on the switching shaft 4. Contactor 18 is mounted on the plate 17 and is slidable on the common contact 15 and contact 14 on the base plate 8. This effects the switching of the circuit of the variable resistors 5 and 5'. Arm 19 is mounted on and is rotatable with the shaft 4. Fine adjusting shaft 20 is loosely fitted on shaft 4 and has a small gear 21. 22 is the adjusting body mounted rotatably on one end of the arm 19. The adjusting body has the large gear 23 and a driver unit 24. Unit 24 is arranged to be in opposition to the head unit 6 of the shaft 7 of either one of the variable resistors 5 or 5'.

At the other insulating plate 3 is a switch capable of switching from the UHF reception condition to the VHF reception condition by interlocking with the rotation of the shaft 4. The switch includes the changeover switch for the transistors, a constant voltage changeover switch for biasing the variable reactance element, and the coil changeover switch for high band and low band of VHF band. Spring 25 is interposed between the frame 2 and arm 19. 26 is the driver inserting hole provided at the position on frame 2 in opposition to the shaft 7 of the variable resistors 5 and 5'.

In the operation, at FIG. 6, when the shaft 4 is rotated to set it to one channel of the UHF position, the switch on the insulated plate 3' is automatically switched to the UHF reception condition and simultaneously the insulated plate 17 fixed to the shaft 4 is rotated. The contactor 18 slides on the contact 10 on the base plate 3 and the common contact 15 and thus the one variable resistor 5' is switched to the UHF circuit. The adjusting body 22 is also rotated simultaneously with the rotation of the shaft 4 by the arm 19, and the driver unit 24 is disposed in opposition to he shaft of the resistor 5'. Thereafter, the fine adjusting shaft 20 is pressed against the spring 25 in the condition as shown in FIG. 6. The driver unit 24 penetrates through the hole 26 of the frame 2, and engages with the head portion 6 of the shaft 7 of the variable resistor 5'. When the fine adjusting shaft 20 is turned, the shaft 7 is turned by means of the gears 21 and 23 and the driver unit 24. The sliding element 9 shifts on the resistor body 8 resulting in the fine adjusting of the resistance value between the sliding element 9 and conductor 10. The constant voltage impressed between the terminals 11 and 13 is varied and the voltage for the reverse bias of the desired variable reactance is produced between the terminals 11 and 16, thereby producing the best reception condition of the UHF channel.

After the adjustment, when the pressure force of the fine adjusting shaft 20 is removed, the fine adjusting shaft 20, arm 19 and adjusting body 23 are returned to the position prior to the application of the pressure.

Thereafter, when the rotary shaft 4 is rotated and the UHF channel is switched to the VHF channel, the tuner is switched automatically to the VHF reception condition, and thereafter the adjustment is effected in the same manner as the UHF reception.

What is claimed is:

1. A multi-channel tuner including a VHF section and a UHF section, said tuner comprising:

a. first switch means for switching power to either said VHF or UHF section of said tuner;

b. said VHF section having a high frequency band and a low frequency band and said VHF section including a VHF coil having a first portion which is short-circuited when said VHF section is operating in said high frequency band;

c. short-circuit switch means connected in parallel with said first portion of said VHF coil for short-circuiting said first portion when said VHF section is operating in said high frequency band;

d. second switch means coupled between a power source and said short-circuit switch means for connecting said power source to said short-circuit switch means thereby changing the polarity across said short-circuit switch means whereby the state of said short-circuit switch means is reversed:

e. tuning capacitor means comprising a variable capacitance element in said VHF section and in said UHF section of said tuner;

f. a plurality of variable resistor means, coupled to said tuning capacitor means, for supplying a reverse bias to said tuning capacitor means; and g. third switch means for coupling only one of said plurality of variable resistor means to said variable capacitor means at a time, wherein said first, second and third switch means have a common operating shaft.

2. The multi-channel tuner as set forth in claim 1 wherein each variable resistor means corresponds to one channel of said tuner, said variable resistor means including selector means for varying the resistance of each of said variable resistor means whereby the reverse bias of said variable capacitor means may be varied for each channel by varying the corresponding one of said variable resistor means.

3. A preset device for a multichannel tuner having a UHF section and a VHF section comprising:

a. first and second sheets of insulating base plate;

b. a channel change shaft perpendicular to and passing through said first and second sheets;

c. a plurality of variable resistors each resistor corresponding to one channel of said multi-channel tuner, wherein each said variable resistor is a C type resistor printed on the back of said first sheet, said plurality forming a pattern of a circle concentric with said channel change shaft, and wherein each said resistor includes a shaft having a head passing through said first sheet;

d. changeover switch means positioned on said second sheet for switching said tuner between said UHF section and said VHF section, said changeover switch means being driven by said channel change shaft; and e. tuning means for tuning said tuner, said tuning means having a driver means for engaging said shaft of said variable resistors and a fine adjusting shaft for moving said driver means, wherein said fine tuning means tunes each channel of said tuner by varying the resistance of one of said variable resistors.

4. The device of claim 3 wherein said driver means is operatively connected to said fine adjusting shaft by gears.

5. The preset device of claim 4 wherein each of said variable resistors has a slot therein positioned to mate with said driver means such that rotating said fine adjusting shaft rotates said gear which rotates said driver means thereby rotating the slot on one of said variable resistors whereby the resistance of said variable resistor is changed.

* * * * *

Notice of Adverse Decision in Interference

In Interference No. 98,922, involving Patent No. 3,678,421, I. Ono, PRESET DEVICE FOR ALL CHANNEL TUNER USING VARIABLE REACTANCE ELEMENT AS TUNING ELEMENT, final judgment adverse to the patentee was rendered July 28, 1977, as to claims 1 and 2.

[*Official Gazette July 4, 1978.*]

Disclaimer 3,678,421.—*Ichiro Ono*, Tokyo, Japan. PRESET DEVICE FOR ALL CHANNEL TUNER USING VARIABLE REACTANCE ELEMENT AS TUNING ELEMENT. Patent dated July 18, 1972. Disclaimer filed Mar. 27, 1978, by the assignee, *Alps Electric Co., Ltd.*

Hereby enters this disclaimer to claims 1 and 2 of said patent.

[*Official Gazette September 12, 1978.*]